Feb. 3, 1948.  L. A. ROSS  2,435,514
PORTABLE VISUAL INDICATOR FOR MACHINE SHOP WORK SETUPS
Filed May 22, 1945  3 Sheets-Sheet 2

INVENTOR
LEE A. ROSS
BY
ATTORNEYS

Feb. 3, 1948. L. A. ROSS 2,435,514
PORTABLE VISUAL INDICATOR FOR MACHINE SHOP WORK SETUPS
Filed May 22, 1945 3 Sheets-Sheet 3

INVENTOR
LEE A. ROSS
BY
Austin, Wilhelm & Carlson
ATTORNEYS

Patented Feb. 3, 1948

2,435,514

UNITED STATES PATENT OFFICE 2,435,514

PORTABLE VISUAL INDICATOR FOR MACHINE-SHOP WORK SETUPS

Lee Allen Ross, Lebanon, Pa.

Application May 22, 1945, Serial No. 595,171

2 Claims. (Cl. 177—311)

The invention relates to indicators for indicating the height of a surface to be machined, and more particularly to a portable visual indicator capable of a wide variety of uses.

In metal machining it is common practice to use surface gauges to measure the distance to, or to gauge the accuracy of, a surface. Such gauges commonly take the form of a conventional surface gauge utilizing a sharp pointed rod or pick at the top of an adjustable post secured to a base. Other surface gauges take the form of dial indicators which indicate the accuracy of the surface by the position of a rotary pointer on a dial. Both of these gauges may be used to measure variations in surface height or the exact distance of a surface from a reference point. The sharp pointed rod surface gauge suffers the disadvantage of being difficult to see exactly when the pointer engages the work, particularly when the place to be measured is difficult to see, as at the bottom of a comparatively deep and narrow hole. Dial indicators suffer the additional disadvantage of being too large to fit into the inside of a small hole. Both types suffer the disadvantage of difficult visibility when measuring a surface in a location accessible to the gauge but not accessible to the user.

The present invention proposes to overcome the above disadvantages by providing a visual indicator to indicate when any stylus or pointer engages the surface to be measured or tested. This stylus may be the pointed rod of a conventional surface gauge, or it may take the form of a special pointed rod clamped to, for example, the tool post of a lathe, or it may be the cutting tool itself, for example, of a boring mill.

According to the preferred form of the invention, the visual contact gauge may comprise a casing of a size of an ordinary small hand flashlight having a bulb at one end for visibility from different directions. Projecting from the midpoint of the casing is a clamp for clamping the casing to a convenient part of the work setup and for making electrical contact. The casing may have a second terminal projecting therefrom to which a flexible lead wire is suitably connected, said lead having a clamp for electrical connection to the setup. Such an indicator is capable of use in a wide variety of setups and is entirely self-contained, requiring no connection with outside power.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Figure 1:
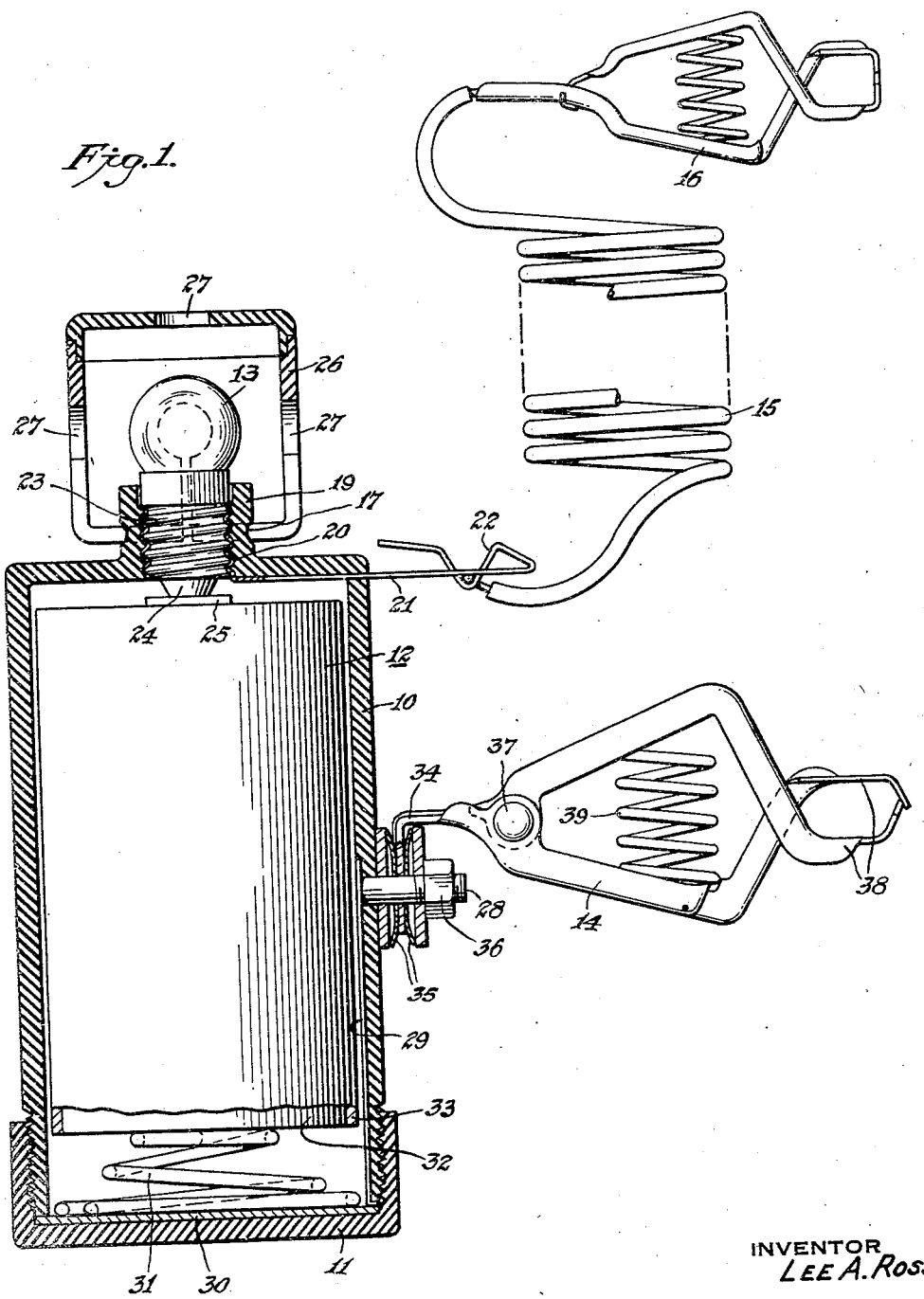
Fig. 1 is a representation of the visual indicator, the casing being shown in section.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Fig. 1, the visual indicator comprises, generally, a casing 10 having detachable cover 11 containing flashlight battery 12 and flashlight bulb 13. A clamp 14 is connected to the body of the casing for supporting the indicator in operative position and for making electrical contact. A flexible lead 15 and a clamp 16 are provided for electric connection to another part of the setup on which the indicator is used, as explained hereinafter more in detail. It will be understood that the electric circuit is such that, when the circuit is completed through the setup from clamp 14 to clamp 16 the bulb 13 will be lighted.

The casing 10, which may be made of suitable plastic or other insulating material, has a reduced neck 19 supporting a screw threaded metal sleeve 20 to which lead 21 is connected. A suitable binding post, which may be a spring clip 22, may be formed integral with lead 21 for connection to the flexible lead 15. The flexible lead 15 may be almost any insulated wire of sufficient length;

in the form shown the lead 15 is in the form of a helical coil having spring characteristics to cause it to normally take a substantially retracted position, as shown in Fig. 1, but which may be stretched to a considerable length if required by the particular setup in which the indicator is used.

The electric bulb 13 may be of any usual flashlight type having the usual threaded contact sleeve 23 and center contact 24. The bulb sleeve 23 makes contact with the casing sleeve 20 by being threaded thereinto and the center contact 24 engages center electrode 25 of the dry cell 12.

The coil 15 will be long enough to take care of usual conditions. For setups requiring them, an extra long lead may be provided and substituted for lead 15, the spring clip 22 facilitating the change.

The casing 10 has a post 28 fixedly set in the side wall thereof, the post having a metallic strip 29 bent around the lower end of the casing wall as indicated. The bottom cover 11, which may be also made of suitable insulating material, is screwed onto the bottom of casing 10 and contains a conducting plate 30 engaging metal strip 29 and which also engages the usual flashlight spring 31 to make electric contact with the container 32 forming the outer electrode of the dry cell. If desired, the dry cell may have the usual paper covering 33.

The large clamp 14 is swiveled to binding post 28 in such manner as to firmly support the casing 10 upon a convenient part of the setup but yet permit it to be turned to place the bulb in a visible position. The clamp 14 has an angle 34 resiliently held between a pair of spring washers 35 and the entire assembly is clamped together by an abutment 36 shown in the form of a nut screwed on the end of binding post 28. The abutment may be in the form of a head formed by peening over or upsetting the material of the binding post 28.

The clamp 14 may be of any suitable type which will both mechanically support the casing 10 and make electrical contact with the work setup. This clamp 14 may have a pivot 37 and jaws 38 forced together by spring 39. The teeth of the jaws may grip the work set up or, in the case of clamping to bolts and the like, the recessed parts back of the teeth may engage the work setup.

The casing 10 is provided with a hood 26 having holes 27 in the sides and top, to protect the flashlight bulb 13 and also to aid in observing the lighting of the bulb when the indicator is used in a well lighted shop, as for example in bright sunshine. The hood 26 may be partially split at the lower part thereof so as to resiliently engage a groove 17 on the neck so that the hood may be snapped on or off of the casing body to replace bulb 13 or for other purposes.

It will be seen that the circuit of the indicator is such that the bulb 13 will light whenever electric connection is made between clamps 16 and 14. Tracing the circuit from the central battery electrode 25, current flows into the center bulb contact 24, through the filament of bulb 13 to sleeve 23, and thence to casing sleeve 20, lead 21, clip 22, flexible lead 15, clamp 16, clamp 14, swivel post 28, lead 29, metal plate 30, spring wire 31, back to the outer electrode 32 of the dry cell.

Figure 2:
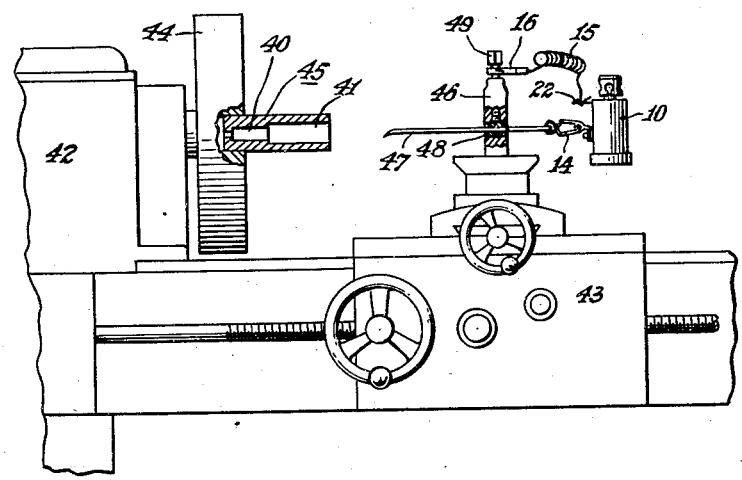
Fig. 2 illustrates diagrammatically one manner in which the visual indicator may be used on a lathe.

Considering now the several setups shown for purposes of illustration, Fig. 2 illustrates diagrammatically a conventional lathe having head stock 42 and carriage 43 carrying tool post 46. The head stock 42 supports the usual face plate 44 which is shown in the form of a chuck clamping work 45 which it is desired to rebore. The smaller bore 40 is true while the larger bore 41 is worn and must be rebored.

One manner of using the visual indicator is as follows. A contact stylus in the form of a pointed pick 47 is clamped in the tool post 46 after first wrapping a piece of insulation 48, which may be a piece of paper, around the pick 47. The bolt 49 is screwed down to firmly clamp the pick 47 in the tool post. The large clamp 14 of the indicator may then be placed on the pick 47 and the small clamp 16 on the shank of bolt 49.

It will be understood that by suitable adjustment of the tool post 46, the pick 47 will be inserted inside work 45 with its point engaging the smaller bore 40. The jaws of clamp 44 will then be adjusted so as to center the work 45 in such manner that the point of pick 47 engages the smaller bore 40 evenly and uniformly throughout the axial length of surface 40 and throughout its circumference when the face plate 44 is rotated.

Without the visual indicator it is extremely difficult to tell when even and uniform engagement is obtained between the pick 47 and the smaller bore 40 because of the small diameter of the test surface and its location at the bottom of a comparatively long narrow bore. However, with the help of the visual indicator it is comparatively easy to tell when uniform contact is obtained between the point of pick 47 and the smaller bore 40.

The electric circuit is established as follows. The large clamp 14 is connected to the insulated pick 47 and the small clamp 16 is connected to the bolt 49 which is grounded on the machine and thus to the work 45 which is also grounded. When the pick 47 touches the work 45, electric connection is established between clamps 14 and 16 of the visual indicator which lights its bulb.

Figure 3:
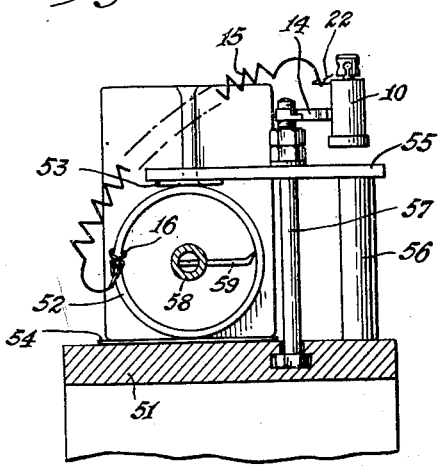
Fig. 3 represents diagrammatically an end view of a horizontal boring mill showing another manner in which the visual indicator may be used.

Referring now to Fig. 3, another setup is shown, this one in the form of a horizontal boring mill. Here the work, which may be in the form of a comparatively long cylinder 52, is fixedly mounted on the table 51. This mounting is done by providing one or more clamping plates 55 having blocks 56 interposed between the plates 55 and the table 51. Bolts 57, having their heads engaged in T-slots on the table, pass through the clamping plates 55 and nuts bear down on the plates 55 to securely clamp the work 52 down on the table 51. Suitable layers of insulation 53 and 54, such as paper, are interposed between the work 52 and the table 51 and clamping plates 55.

The arbor of the boring mill is indicated by 58. This arbor has secured thereto the usual cutting tool 59 which acts as the contact stylus in this case. The arbor is supported at its opposite ends in suitable vertically adjustable carriages (not shown) as will be understood by those skilled in the art. It will be understood that the object of this operation is to adjust the arbor 58 so that it is exactly centered with respect to the work 52.

The visual indicator is connected to this setup by placing the larger clamp 14 on one of the bolts 57 and the smaller clamp 16 around the edge of the work 52. It will thus be seen that whenever the cutting tool 59 touches the work 52, the electric circuit is completed to light the flashlight bulb. This circuit is as follows. Starting with the large clamp 14 which is grounded to the frame of the machine, the circuit includes the arbor 58 and tool 59 which are also grounded to the frame of the machine. The circuit is then completed by engagement of cutting tool 59 with the insulated work 52 through small clamp 16 and flexible lead 15.

It will be understood that the arbor 58 will be adjusted and the tool 59 adjusted in the arbor so that uniform contact is obtained between the tool 59 and all parts of the periphery of the internal surface of work 52 at the test places. These test places may be any unworn parts of the internal surface and may be midway of the length of the long cylinder 52 or at the ends or at any other place. It will be seen that, regardless of the inaccessibility of the test surface or its distance from the eyes of the machinist, a condition of uniform contact between the tool 59 and the work 52 can be tested with certainty by observing the flashlight bulb as described above.

Figure 5:
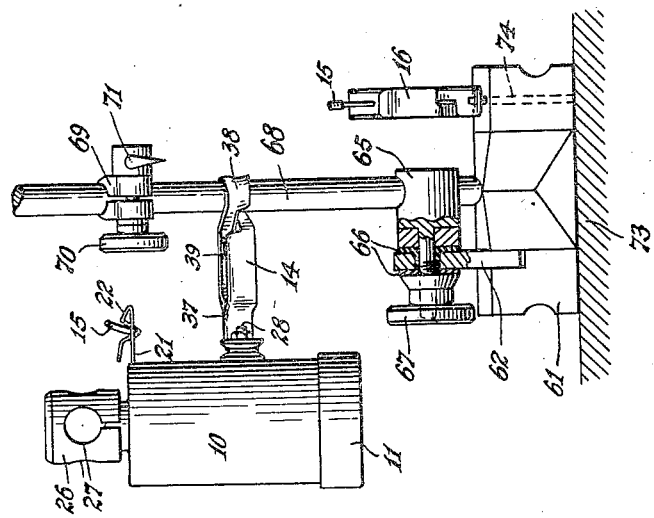
Figure 4:
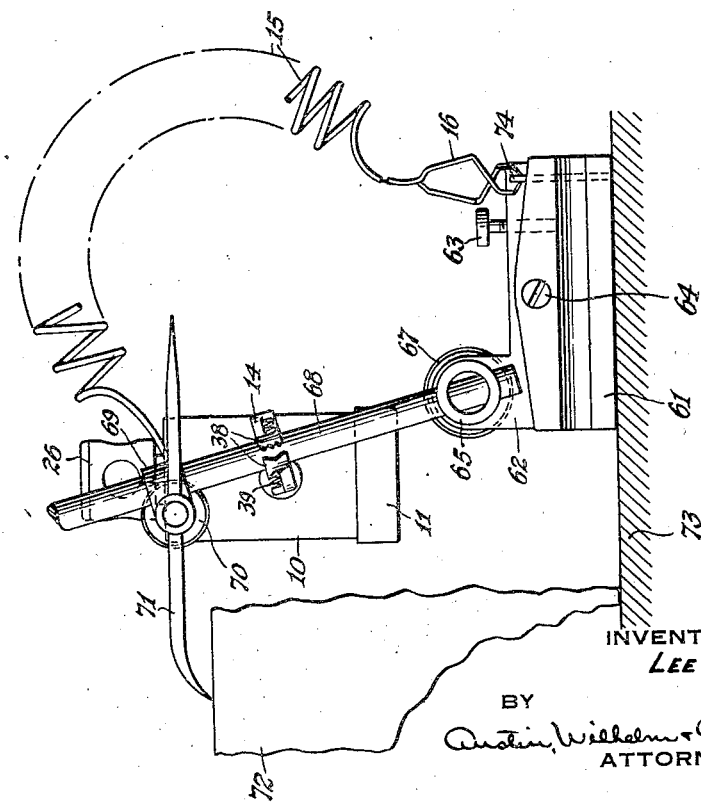
Fig. 4 is a side elevation, and Fig. 5 an end elevation, of a surface gauge illustrating another manner in which the visual indicator may be used.

Considering now Figs. 4 and 5, the visual indicator is shown associated with a more or less standard surface gauge. The surface gauge comprises a flat base 61 having an adjustable fulcrum bar 62 pivoted thereto at fulcrum 64. Adjusting screw 63 enables the bar 62 to be swiveled in a vertical plane. The bar 62 adjustably supports a post 68 which has a hub 65 with a reduced stem on which is screw threaded thumb nut 67. Suitable insulation 66 is interposed between the bar 62 and hub 65 for the purpose of utilizing the invention.

A stylus or pick 71 passes through an opening in a split collar member 69 which surrounds post 68 and a thumb nut 70 clamps both the split collar 69 on post 68 and the pick 71 in proper longitudinal and rotative position with respect to split collar 69 as will be understood by those who use this type of surface gauge.

The visual indicator may be mounted by placing the jaws of the large clamp 14 around the post 68 and placing the small clamp 16 on one of the stop pins 74 usually present on a surface gauge of this type.

The use of the surface gauge with the invention applied thereto is similar to ordinary use thereof. The work is indicated by 72 and is shown as resting upon the metal surface of the work table 73 on which the base 61 of the surface gauge also rests. Assuming that it is desired to measure the distance between the top surface of the work 72 and the surface of the work table 73, the surface gauge will be adjusted by manipulating the nuts 70, 67 and adjusting screw 63 in a manner well known to those skilled in the art until the end of pick 71 lightly touches the top of the work 72. The condition of correct engagement between the point of pick 71 and the surface of work 72 is ascertained by observing the lighting of the flashlight bulb as explained in the other setups above.

The electric circuit established by contact of pick 71 and work 72 is as follows. The work 72, table 73 and base 61 of the surface gauge and stop pins 74 are all grounded to the work table 73. The pick 71 is insulated from the base 61 of the surface gauge by the insulation 66. Starting with large clamp 14, the circuit is established through post 68, pick 71, work 72, work table 73, surface gauge base 61, pin stops 74, back to smaller clamp 16.

It will be understood that, if desired, either one or both mechanical spring clamps may be replaced by an appropriate permanent magnet. Such magnets may be conveniently used both to affix the visual indicator to the work setup and to make electrical contact when both the work and machine are made of steel or other magnetic material to which the permanent magnets will adhere. When the work is of brass or some other non-magnetic material, and it is desired to connect one of the terminals of the visual indicators to it, a spring pressed clamp or some other mechanical clamping device must, of course, be used.

It will be understood that it is often difficult to tell when a fine pointed stylus, such as the point of an ordinary pick or even the tip of a cutting tool lightly engages or just touches a surface, with any degree of accuracy. Heretofore it has been customary to rely largely upon the senses of feel and sight. These senses are often unreliable, and are particularly so, when the point to be measured or tested is in some remote or inaccessible place. The use of the visual indicator not only increases the accuracy when testing in such remote or inaccessible places, but also increases the accuracy where the surface to be tested is easily accessible, since most accurate measurements are obtained when the stylus touches the surface with the proper contact pressure, bearing thereon neither too firmly nor too lightly. The correct contact condition may be indicated when the bulb flashes substantially continuously but flickers very slightly as the stylus or work is moved to engage the stylus with different parts of the test surface.

It will be understood that the visual indicator may be used in relationships other than those shown and that the above setups are given merely for purposes of illustration. This indicator is extremely adaptable, offering a great many different uses. It is self-contained, requiring no outside power connection. It may be built into a surface gauge by more or less permanently affixing the clamp to the post and the flexible lead to the base. Or, it may form part of work setups including parts of lathes, boring mills, milling machines, internal and external grinders, etc.

In any case, the stylus must be electrically insulated from the work. In some cases the stylus is insulated from the work table or machine frame and the work is grounded on the work table or machine frame, and in other cases the stylus is grounded and the work insulated.

While certain novel features of the invention have been disclosed herein, and are pointed out in the annexed claims, it will be understood that various omissions, substitutions and changes may be made by those skilled in the art without departing from the spirit of the invention.

What is claimed is:

1. A portable, universal, battery-powered visual indicator for use with different machine shop work setups in which first and second parts of the work setup are electrically insulated from each other and between which parts it is desired to make contact for setting up the work; said indicator comprising a casing, a battery in said casing, a lamp supported by said casing, a positioning spring clamp secured to said casing for clamping the indicator to a first part of the work setup to positively support the indicator in convenient position for the machinist to observe said lamp, said clamp also serving to make electric connection with the work setup, a lead wire, said casing having means forming a circuit, which includes said lamp and battery, between said positioning clamp and lead wire, a second spring clamp connected to said lead wire and adapted to clamp onto and make electric connection with the second part of the work setup, said clamps being of the universal type to engage and grip a wide variety of parts, whereby establishment of contact between said parts of the work setup is readily noted by lighting of said lamp.

2. A portable, universal, battery-powered visual indicator for use with different machine shop work setups in which first and second parts of the work setup are electrically insulated from each other and between which parts it is desired to make contact for setting up the work; said indicator comprising a cylindrical casing, a battery in said casing, a lamp supported by the top of said casing, an apertured hood detachably secured to said casing and surrounding said lamp, a swivel device secured to the side wall of said casing midway the length thereof, a positioning spring clamp secured to said swivel device for clamping the indicator to a first part of the work setup to positively and adjustably support the indicator in convenient position for the machinist to observe said lamp, said clamp also serving to make electric connection with the work setup, a lead wire, said casing having means forming a circuit, which includes said lamp and battery, between said positioning clamp and lead wire, a second spring clamp connected to said lead wire and adapted to clamp onto and make electric connection with the second part of the work setup, said clamp being of the universal type to engage and grip a wide variety of parts, whereby establishment of contact between said parts of the work setup is readily noted by lighting of said lamp.

LEE ALLEN ROSS.

REFERENCES CITED

The following references are of record in the file of this patent:

UNITED STATES PATENTS

| Number | Name | Date |
| --- | --- | --- |
| 1,040,715 | Mann | Oct. 8, 1912 |
| 1,453,635 | Morris | May 1, 1923 |
| 1,553,814 | Hansen | Sept. 15, 1925 |
| 2,005,887 | Carson | June 25, 1935 |
| 2,069,563 | Segal | Feb. 2, 1937 |
| 2,217,509 | Bryant | Oct. 8, 1940 |
| 2,361,462 | Dickinson | Oct. 31, 1944 |

FOREIGN PATENTS

| Number | Country | Date |
| --- | --- | --- |
| 192,763 | Great Britain | Feb. 7, 1923 |